(12) United States Patent
Bialer et al.

(10) Patent No.: US 10,627,481 B2
(45) Date of Patent: Apr. 21, 2020

(54) MULTI-RESOLUTION DOPPLER PROCESSING

(71) Applicant: GM GLOBAL TECHNOLOGY OPERATIONS LLC, Detroit, MI (US)

(72) Inventors: Oded Bialer, Petah Tivak (IL); Igal Bilik, Rehovot (IL)

(73) Assignee: GM GLOBAL TECHNOLOGY OPERATION LLC, Detroit, MI (US)

( * ) Notice: Subject to any disclaimer, the term of this patent is extended or adjusted under 35 U.S.C. 154(b) by 256 days.

(21) Appl. No.: 15/687,966

(22) Filed: Aug. 28, 2017

(65) Prior Publication Data

US 2019/0064319 A1    Feb. 28, 2019

(51) Int. Cl.
*G01S 7/292*     (2006.01)
*G01S 13/931*    (2020.01)
*G01S 13/58*     (2006.01)
*G01S 13/90*     (2006.01)

(52) U.S. Cl.
CPC ............ *G01S 7/292* (2013.01); *G01S 13/584* (2013.01); *G01S 13/931* (2013.01); *G01S 13/9047* (2019.05)

(58) Field of Classification Search
CPC ........................................................ G01S 7/292
USPC ........................................... 342/94, 260, 373
See application file for complete search history.

(56) References Cited

U.S. PATENT DOCUMENTS

2017/0160381 A1*  6/2017  Cho ..................... G01S 13/90

\* cited by examiner

*Primary Examiner* — Bo Fan
(74) *Attorney, Agent, or Firm* — Reising Ethington, P.C.

(57) ABSTRACT

A system and method are provided for processing echo signals reflected from one of more targets in a radar field-of-view. The method includes receiving echo signals reflected from one or more targets in the radar field-of-view in response to a sequence of transmit pulses; generating a received signal vector containing samples from the received echo signals; and applying the received signal vector to a set of filters configured to calculate a Doppler spectrum for a set of Doppler frequencies to which each filter is tuned, wherein an integration processing time for each filter varies relative to the Doppler frequency of each filter.

10 Claims, 2 Drawing Sheets

MULTI-RESOLUTION DOPPLER PROCESSING

TECHNICAL FIELD

The present invention relates generally to radar systems, and more particularly, to a system and method for implementing multi-resolution Doppler processing.

BACKGROUND

Many modern vehicles are equipped with advanced safety and driver-assist systems that require robust and precise object detection and tracking systems to control responsive host vehicle maneuvers. These systems utilize periodic or continuous detection of objects and control algorithms to estimate various object parameters, such as the relative object range, velocity, direction of travel, and size. For example, radar devices detect and locate objects (i.e., targets), by transmitting electromagnetic signals that reflect off targets within a sensor's field-of-view. The reflected signal returns to the radar as an echo where it is processed to determine various information such as the round-trip travel time of the transmitted/received energy. However, when multiple targets are present, certain radar devices lack the angular and spatial resolution necessary to distinguish between multiple targets that are closely-located (i.e., no point target assumption). In these cases, wherein two closely-located targets cannot be separated by range or angle, the targets may still be separated by a Doppler frequency if the Doppler resolution of the radar device is sufficiently high.

The Doppler effect manifests itself when there is a relative range rate, or radial velocity, between the radar and the target. When the radar's transmit signal is reflected from such a target, the carrier frequency of the return signal will be shifted. Assuming a collocated transmitter and receiver, the resulting Doppler frequency shift is a function of the carrier wavelength and the relative radial velocity (range rate) between the radar and the target. When the target is moving away from the radar, the relative radial velocity, or range rate, is defined to be positive and results in a negative Doppler shift.

Radar systems employing Doppler processing can be either continuous wave (CW) or pulsed. CW radars simply observe the Doppler shift between the carrier frequency of the return signal relative to the transmit signal. Pulse Doppler radars use a coherent train of pulses where there is a fixed or deterministic phase relationship of the carrier frequency between each successive radio frequency (RF) pulse. Coherence concentrates the energy in the frequency spectrum of the pulse train around distinct spectral lines, separated by the pulse repetition frequency (PRF). This separation into spectral lines allows for discrimination of Doppler shifts.

The pulsed nature of the transmitted signal permits time gating of the receiver, which allows for blanking of direct transmit energy leakage into the receiver. This permits the use of a single antenna for transmit and receive, which otherwise would not be feasible. Pulse Doppler radars can also use range gating, which divides the inter-pulse period into cells or range gates. The duration of each range gate is typically less than or equal to the inverse of the transmit pulse bandwidth. Range gating can help eliminate excess receiver noise from interfering with target return pulses, and allow range measurement with pulse delay ranging (i.e., measuring the time between transmission of a pulse and reception of the target echo).

The Doppler resolution of a radar is proportional to the Doppler processing integration time, which is the Doppler filter duration time. The Doppler processing integration time is typically determined by the duration that a reflection point (i.e., a target) remains within a range resolution cell. Conventionally, the Doppler processing integration time in radars is fixed across the Doppler frequency spectrum according to the highest known target speed for a particular radar application. Consequently, the Doppler resolution for these radars with respect to slower targets is limited.

SUMMARY

According to an embodiment, there is provided a method for processing echo signals reflected from one of more targets in a radar field-of-view. The method includes receiving echo signals reflected from one or more targets in the radar field-of-view in response to a sequence of transmit pulses, generating a received signal vector containing samples from the received echo signals, and applying the received signal vector to a set of filters configured to calculate a Doppler spectrum for a set of Doppler frequencies to which each filter is tuned, wherein an integration processing time for each filter varies relative to the Doppler frequency of each filter. In one example, the set of filters are configured to apply finite impulse response (FIR and/or discrete Fourier transform (DFT). The Doppler frequency of each filter corresponds to a relative velocity of a detected target. The received signal vector represents echo signals received over a coherent pulse interval (CPI) from transmit pulses transmitted at a pulse repetition frequency (PRF).

In one example, the integration processing time for each filter is inversely proportional to the Doppler frequency of the filter such that the integration processing time increases as the Doppler frequency associated with each filter decreases.

In another example, the integration processing time represents a number of integration samples from the received signal vector that are used to calculate the Doppler spectrum for a given Doppler frequency of a filter, wherein $f_i$ is the set of Doppler frequencies and $N_i$ is the number of integration samples used to calculate the Doppler spectrum for each filter, wherein i ranges from 0 to K−1, where K is the number of filters in the set of filters, and wherein $f_0 < f_{K-1}$ and $N_0 > N_{K-1}$.

According to another embodiment, there is provided a method for processing echo signals reflected from one of more targets in a radar field-of-view. The method includes transmitting a sequence of transmit pulses according to a pulse repetition frequency (PRF), receiving echo signals reflected from one or more targets in the radar field-of-view in response to a sequence of transmit pulses, generating a received signal vector containing samples from the received echo signals, wherein the samples in the received signal vector correspond to a range resolution cell in the field-of-view containing one or more targets, and generating a Doppler spectrum for a set of Doppler frequencies at a particular range gate, the Doppler spectrums being calculated using a predefined number of integration samples from the received signal vector, wherein the predefined number of integration samples vary relative to each Doppler frequency in the set of Doppler frequencies.

According to yet another embodiment of the invention, there is provided a system for processing echo signals reflected from one of more targets in a radar field-of-view. The system includes at least radar sensor configured to receive echo signals reflected from one or more targets in the radar field-of-view in response to a sequence of transmit pulses and at least one signal processing module configured to generate a received signal vector containing samples from the received echo signals and apply the received signal vector to a set of filters configured to calculate a Doppler spectrum for a set of Doppler frequencies to which each filter is tuned, wherein an integration processing time for each filter varies relative to the Doppler frequency of each filter.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

Figure 1:
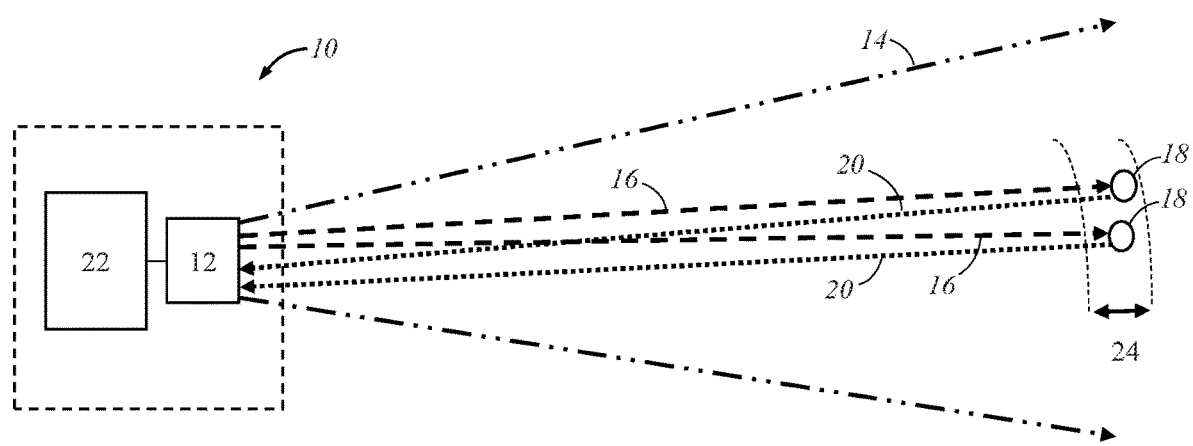
FIG. 1 illustrates an overview of an exemplary radar detection system according to an embodiment of the present disclosure.

As required, detailed embodiments are disclosed herein. However, it is understood that the disclosed embodiments are merely exemplary of various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, components, systems, materials, or methods that are well-known to those having ordinary skill in the art have not been described in detail to avoid obscuring the present disclosure. Therefore, specific structural and functional details disclosed herein are not to be interpreted as limiting, but merely as a basis for the claims and as a representative basis for teaching one skilled in the art. Moreover, while the approach and methodology may in some instances be described below with respect to vehicles, one of ordinary skill in the art appreciates that an automotive application is merely exemplary, and that the concepts disclosed herein may also be applied to any other suitable radar detection systems such as, for example, air traffic control, nautical navigation, and weapons guidance systems, to name a few. The term vehicle as described herein is also to be construed broadly to include not only a passenger car, but any other vehicle including, but not limited to, motor-cycles, trucks, sports utility vehicles (SUVs), recreational vehicles (RVs), marine vessels, and aircraft.

It is known that a radar separates Doppler frequencies of multiple targets to determine their relative velocities using Doppler processing (i.e., filtering). A radar's ability to resolve closely-located targets with respect to velocity depends on the Doppler resolution of the radar (i.e., the resolution of the Doppler filters), which is proportional to the Doppler filter processing integration time (i.e. the Doppler filter time duration). The integration time is determined based on a target coherence time that depends in part on the amount of time a target remains within a range resolution cell. Conventionally, Doppler processing is carried out using a fixed integration time for each of the Doppler filters. In other words, while each of the Doppler filters in a filter bank are tuned to a different Doppler frequency, each of the filters use the same processing integration time, and thus, filter the same number of samples. As a result, each of the filters have the same Doppler resolution, which is often set according to the highest speed target anticipated for a particular application, which limits the radar's ability to determine the velocity of lower speed targets within the same range resolution cell.

Accordingly, the system and method described below are directed to determining the radial velocity of one or more targets in a radar field-of-view, and more particularly, to a radar device configured to discriminate between multiple targets moving at different relative velocities within the same range resolution cell using a method for multiple resolution Doppler processing. As described in detail below, the disclosed radar includes a Doppler filter bank having a plurality of filters tuned to different Doppler frequencies, wherein each of the filters has a pre-defined variable Doppler processing integration time that is proportional to the Doppler frequency. That is, the Doppler processing integration time of each filter varies relative to the Doppler frequency of the filter. More specifically, in one embodiment the Doppler processing integration time of each filter is inversely proportional to the Doppler frequency of each filter. In this way, for any given Doppler output spectrum of a radar (i.e., Doppler profile), the filters tuned to Doppler frequencies in the lower end of the spectrum (corresponding to lower speed targets) are configured to have longer processing integration times relative to the filters tuned to Doppler frequencies in the higher end of the spectrum (corresponding to higher speed targets). An increase in Doppler resolution is thus achieved with respect to all detected targets within a particular observing volume of a radar.

FIG. 1 illustrates a radar detection system 10 that can be used to implement the disclosed method. While the approach and methodology described herein relate to the radar configuration shown in FIG. 1, one of ordinary skill in the art appreciates that radar detection system 10 is merely exemplary, and in many ways, has been simplified for ease of explanation. One further appreciates that the concepts and method disclosed herein may be applied to any suitable radar detection system with any geometric configuration including, but not limited to, radar systems having synthetic and/or physical antenna elements uniformly or non-uniformly spaced apart and arranged as linear arrays, planar arrays, and/or conformal arrays. Moreover, one of ordinary skill in the art understands that the signal processing module shown in FIG. 1 is overly simplified for ease of explanation. In practice, the signal processing module may vary in structure and complexity depending on the specific application and design criteria for the radar detection system 10. In addition, while for explanation purposes FIG. 1 illustrates a single signal processing module, one of ordinary skill in the art appreciates that radar system 10 may be configured to include separate modules and/or devices configured to carry out radar functionality such as, but not limited to, signal generation and transmission; receiving and processing echo signals; and parameter detection and estimation.

The radar detection system 10 shown in FIG. 1 includes one or more radar sensors 12 configured to create a sensor field-of-view 14 that monitors a particular zone of interest. The radar sensors 12 are configured to transmit electromagnetic signals 16 that reflect off remote objects or targets 18 within the radar sensor's field-of-view 14. The reflected signals 20 return as an echo and are processed by a signal processing module 22 configured to extract information from the echo relating to the detected targets such as, for example, range, azimuth angle, and range rate data including Doppler measurements. The signal processing module 22 may be a unitary module or may include a plurality of other modules, or sub-modules, configured to receive and process radar echo signals in accordance with the method and algorithms disclosed herein.

In one embodiment, the signal processing module 22 includes, without limitation, amplifiers, mixers, oscillators, combiners, filters, and converters. The functions performed by signal processing module 22 may vary, but generally include performing various filtering, amplification, conversion and digitizing functions, as well as analyzing various properties of the signal to determine characteristics of the signal such as phase, frequency, and amplitude. As understood by those skilled in the art, the techniques used to extract this information from the signals may vary, but may include without limitation, in-phase and quadrature analysis and frequency domain analysis using Fourier transform. In one embodiment, the signal processing module 22 may also include, without limitation, components to perform pulse compression and clutter rejection (e.g., Doppler filtering) functions. As described in detail below, in accordance with the methods disclosed herein, the signal processing module 22 is configured to generate a Doppler profile and to determine the radial velocity of one or more targets 18 in the radar field-of-view 14, and more particularly, to discriminating between multiple targets 18 moving at different relative velocities within the same range resolution cell 24.

In one particular embodiment, the radar detection system 10 is implemented on a vehicle, wherein the signal processing module 22 may be implemented as a vehicle control module configured to receive the output of the radar sensors 24. The control module may include any variety of electronic processing devices, memory devices, input/output (I/O) devices, and/or other known components, and may perform various control and/or communication related functions. Depending on the particular embodiment, control module may be a stand-alone vehicle electronic module, it may be incorporated or included within another vehicle electronic module (e.g., a park assist control module, brake control module, etc.), or it may be part of a larger network or system (e.g., collision control module (CCM), a traction control system (TCS), electronic stability control (ESC) system, antilock brake system (ABS), driver assistance system, adaptive cruise control system, lane departure warning system, etc.), to name a few possibilities. Control module is not limited to any one particular embodiment or arrangement.

Figure 2:
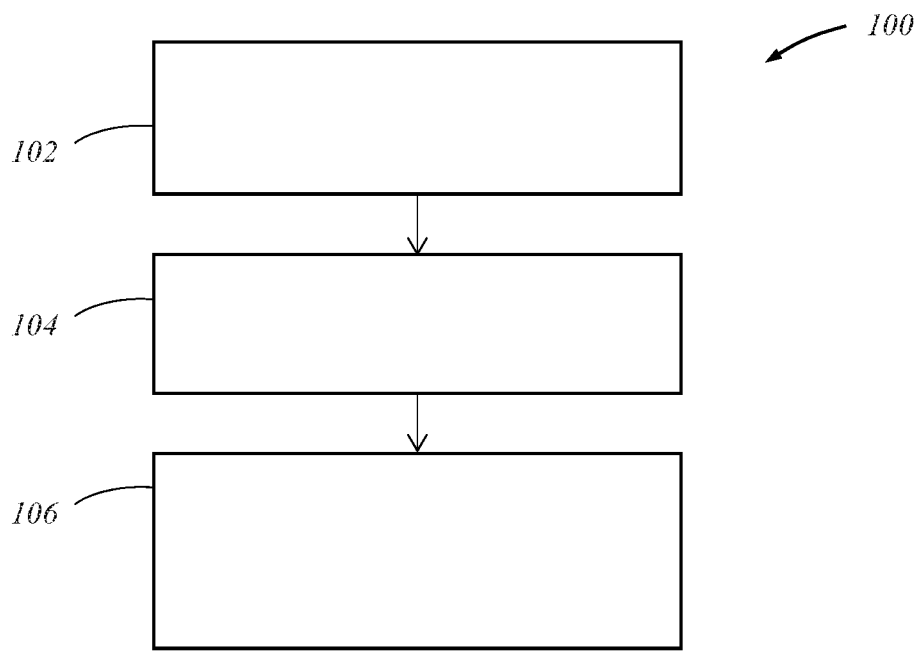
FIG. 2 illustrates a flow chart depicting an exemplary method for implementing multi-resolution Doppler processing according to an exemplary embodiment of the present disclosure.

FIG. 2 illustrates a flow chart depicting an exemplary method 100 for implementing multi-resolution Doppler processing using the radar detection system 10 described above with respect to FIG. 1. It should be understood that the steps of the method 100 are not necessarily presented in any particular order and that performance of some or all the steps in an alternative order is possible and is contemplated. The method 100 begins at step 102 by generating and transmitting electromagnetic signals using radar sensors 12 according to known techniques. In one embodiment, the signals are transmitted as a sequence of pulses having a pulse width and pulse repetition frequency (PRF).

At step 104, echo signals reflected from one or more targets in the radar field-of-view 14 are received at the signal processing module 22. In one embodiment, the echo signals are sampled at a sampling frequency $F_s$ and processed according to known techniques to generate a received signal vector x, representing the received signal samples for each range cell, which may also be referred to as range bins or gates. In one non-limiting example, $x=[x_0, x_1, \ldots x_{L-1}]$, where L is the number of transmit pulses in a coherent processing interval (CPI). Stated differently, x represents the samples of the received echo signal in response to L transmit pulses, wherein the samples in x correspond to a specific range cell (i.e., a specific range location) in the range resolution cell 24. As understood by those skilled in the art, the number of range cells or gates for a particular range resolution cell depends in part on the range resolution of the radar, the pulse width, and pulse repetition frequency (PRF).

At step 106, a Doppler spectrum is calculated for a set of Doppler frequencies (i.e., filtering frequencies) at a particular range gate. In one embodiment, the Doppler spectrums are calculated using a predefined number of integration samples from the received signal vector, wherein the predefined number of integration samples vary relative to each Doppler frequency in the set of Doppler frequencies. The Doppler spectrums may be calculated according to any Doppler processing technique suitable for the disclosed method, including, but not limited to, finite impulse response (FIR) processing, infinite impulse response (IIR), and discrete Fourier transform (DFT).

In one embodiment, the received signal vector is applied to a set of filters configured to calculate the Doppler spectrum for the set of Doppler frequencies to which each filter is tuned, wherein an integration processing time for each filter varies relative to the Doppler frequency of each filter. The integration processing time for each filter is inversely proportional to the Doppler frequency of the filter, such that the integration processing time increases as the Doppler frequency associated with each filter decreases. The integration processing time represents a number of integration samples from the received signal vector that are used to calculate the Doppler spectrum for a given Doppler frequency of a filter. The Doppler frequency of each filter corresponds to a relative velocity of a detected target. In one embodiment, the set of filters are configured to apply discrete Fourier transform (DFT).

According to a particular embodiment, the Doppler spectrum for a set of Doppler frequencies $f_i = \{f_0, f_1, \ldots, f_{K-1}\}$ is calculated by filtering the received signal vector using the function $g(x,f_i,N_i)$, where $N_i$ is the duration of samples of the received signal vector x that are used for the calculation of the Doppler spectrum in $f_i$, and K is the number of filters in a set of filters over which the Doppler spectrum is calculated. In one example, $$g(x, f_i, N_i) = \sum_{n=0}^{N_i-1} x_n e^{j2\pi \frac{f_i}{F_s} n}$$

where $x_n$ is the received sequence of samples with sampling frequency $F_s$, $f_i$ is the set of Doppler frequencies, $N_i$ is the duration or number of integration samples used to calculate the Doppler spectrum for each filter, and wherein $f_0 < f_{K-1}$ and $N_0 > N_{K-1}$.

In this way, the function g uses a larger integration/observation time when calculating the lower Doppler frequencies in the spectrum and a smaller integration/observation time when calculating the higher Doppler frequencies in the spectrum. The reasoning for this approach is that the Doppler spectrum is calculated under the assumption that the target remains in the same range resolution cell, i.e. that the target motion is such that the target is in the same resolution cell.

In one non-limiting example, for the relationship between the Doppler filter frequency, $f_i$ and the number of integration samples used for this filtering, $N_i$, is given by:

$$N_i = \frac{\Delta 2 F_c F_s}{c f_i}$$

where $\Delta$ is the range resolution cell distance (which is typically inversely proportional to the signal bandwidth); $F_c$ is the signal carrier frequency; $F_s$ is the sampling frequency (defined above); and c is the speed of light. The formula above shows that the integration time (realized by the number of integration samples) is inversely proportional to the Doppler frequency. The derivation of the formula is given as follows. Denote $\tau_i$ as the Doppler integration time, which given by:

$$\tau_i = \frac{N_i}{F_s}.$$

The relation between the Doppler frequency and the target relative velocity, v, is given by:

$$f_i = 2 f_c \frac{v}{c},$$

which can be written as $$v = \frac{c f_i}{2 f_c}.$$

By setting the integration time to be equal to the range resolution cell distance $\Delta$, $$\tau_i = \frac{N_i}{F_s} = \frac{\Delta}{v},$$

and by substituting $$v = \frac{c f_i}{2 f_c}$$

into the latter, $$N_i = \frac{\Delta 2 f_c F_s}{c f_i}.$$

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

While the above-description includes a general context of computer-executable instructions, the present disclosure can also be implemented in combination with other program modules and/or as a combination of hardware and software. The terms "algorithm," "method," "application," or variants thereof, are used expansively herein to include routines, program modules, programs, components, data structures, algorithms, and the like. Applications can be implemented on various system configurations, including single-processor or multiprocessor systems, microprocessor-based electronics, combinations thereof, and the like.

What is claimed is:

1. A method for processing echo signals reflected from one of more targets in a radar field-of-view, the method comprising the steps of:
    receiving echo signals reflected from one or more targets in the radar field-of-view in response to a sequence of transmit pulses;
    generating a received signal vector containing samples from the received echo signals;
    applying the received signal vector to a set of filters, wherein each filter of the set of filters is configured to calculate a Doppler spectrum for a Doppler frequency to which the filter is tuned, and wherein an integration processing time for each filter varies based on the Doppler frequency of the filter.

2. The method of claim 1, wherein the integration processing time for each filter is inversely proportional to the Doppler frequency of the filter.

3. The method of claim 1, wherein the integration processing time increases as the Doppler frequency associated with each filter decreases.

4. The method of claim 1, wherein the integration processing time represents a number of integration samples from the received signal vector that are used to calculate the Doppler spectrum for a given Doppler frequency of a filter.

5. The method of claim 4, wherein the number of integration samples from the received signal vector that are used to calculate the Doppler spectrum increases as the Doppler frequency associated with each filter decreases.

6. A method for processing echo signals reflected from one of more targets in a radar field-of-view, the method comprising the steps of:
    receiving echo signals reflected from one or more targets in the radar field-of-view in response to a sequence of transmit pulses;
    generating a received signal vector containing samples from the received echo signals;

applying the received signal vector to a set of filters, wherein each filter of the set of filters is configured to calculate a Doppler spectrum for a Doppler frequency to which the filter is tuned, wherein an integration processing time for each filter varies based on the Doppler frequency of the filter, and wherein the integration processing time represents a number of integration samples from the received signal vector that are used to calculate the Doppler spectrum for a given Doppler frequency of a filter, wherein a relationship between the integration samples and the Doppler frequency is $$N_i = \frac{\Delta 2 f_c F_s}{c f_i},$$

wherein $\Delta$ is a range resolution cell distance, $F_c$ is a signal carrier frequency, $F_s$ is a sampling frequency, c is the speed of light, $f_i$ is a set of Doppler frequencies, and $N_i$ is a number of integration samples.

7. The method of claim 6, wherein $N_i$ is the number of integration samples used to calculate the Doppler spectrum for each filter, wherein i ranges from 0 to K−1, where K is the number of filters in the set of filters, and wherein $f_0 < f_{K-1}$ and $N_0 > N_{K-1}$.

8. The method of claim 1, wherein the set of filters are configured to apply at least one of a finite impulse response filter (FIR) and a discrete Fourier transform (DFT).

9. The method of claim 1, wherein the Doppler frequency of each filter corresponds to a relative velocity of a detected target.

10. The method of claim 1, wherein the received signal vector represents echo signals received over a coherent pulse interval (CPI) from transmit pulses transmitted at a pulse repetition frequency (PRF).

* * * * *